US010005320B2

(12) United States Patent
Yablon (10) Patent No.: US 10,005,320 B2
(45) Date of Patent: Jun. 26, 2018

(54) BICYCLE SKEWER ROD AND LOCK ASSEMBLY (71) Applicant: Delta Cycle Corporation, Randolph, MA (US)

(72) Inventor: Joshua Benjamin Yablon, Oakland, CA (US)

(73) Assignee: Delta Cycle Corporation, Randolph, MA (US)

(*) Notice: Subject to any disclaimer, the term of this patent is extended or adjusted under 35 U.S.C. 154(b) by 136 days.

(21) Appl. No.: 15/180,561

(22) Filed: Jun. 13, 2016

(65) Prior Publication Data
US 2017/0072744 A1 Mar. 16, 2017

Related U.S. Application Data (60) Provisional application No. 62/218,108, filed on Sep. 14, 2015.

(51) Int. Cl.
B60B 35/04 (2006.01)
B62K 25/02 (2006.01)
B60B 27/02 (2006.01)

(52) U.S. Cl.
CPC .............. B60B 35/04 (2013.01); B62K 25/02 (2013.01); B60B 27/023 (2013.01); B62K 2206/00 (2013.01)

(58) Field of Classification Search
CPC ..... B60B 35/04; B60B 35/025; B60B 27/023; B60B 27/026; B62K 25/02; B62K 2025/025; B62K 25/04; B62K 2206/00; B25B 13/50; B25B 13/48; B25B 27/0042; F16B 41/005

USPC .......... 301/110.5, 110.6, 124.1, 124.2, 124; 411/910; 81/176.2, 176.15, 60, 124.3
See application file for complete search history.

(56) References Cited

U.S. PATENT DOCUMENTS

| 5,005,390 | A | 4/1991 | Giannini et al. |
| 5,337,587 | A | 8/1994 | Davidson |
| 5,863,166 | A * | 1/1999 | Young ................... B62H 5/001 301/5.1 |
| RE38,162 | E | 7/2003 | Brown |
| 7,445,414 | B1 * | 11/2008 | Notaro ................ F16B 23/0007 411/432 |

(Continued)

OTHER PUBLICATIONS

Allegion, "Kryptonite", Gravity WheelNutz, http://www.kryptonitelock.com/en/products/product-information/current-key/001768.html, © 2015, one (1) page.

(Continued)

Primary Examiner — S. Joseph Morano
Assistant Examiner — Jean Charleston
(74) Attorney, Agent, or Firm — Iandiorio Teska & Coleman, LLP (57) ABSTRACT A bicycle skewer rod and lock assembly includes a skewer rod with a cap. A security nut sub-assembly is coupled to the other end of the skewer rod. The security nut sub-assembly includes a nut securable to the skewer rod and having a plurality of peripheral keyways, and a sleeve cupped around the periphery of the nut and rotatable with respect to the nut. A key includes a plurality of inwardly depending keys each received through a sleeve sidewall keyway and into a nut peripheral keyway to turn the nut with respect to the skewer rod when the sleeve sidewall keyways are aligned with the nut peripheral keyways.

25 Claims, 10 Drawing Sheets (56) References Cited

U.S. PATENT DOCUMENTS

| | | |
|---|---|---|
| 8,061,169 B2 | 11/2011 | Young |
| 9,631,663 B2 * | 4/2017 | Carnevali ............... F16B 39/12 |
| 2001/0041112 A1 * | 11/2001 | Hampson ............ F16B 23/0069 |
| | | 411/402 |
| 2007/0145814 A1 * | 6/2007 | D'Aluisio ............. B60B 1/0223 |
| | | 301/111.06 |
| 2008/0145181 A1 * | 6/2008 | Lynes ................... B25B 13/065 |
| | | 411/403 |
| 2015/0354620 A1 * | 12/2015 | Ahdoot ................ F16B 41/005 |
| | | 411/167 |

OTHER PUBLICATIONS

Pinhead, "Quick-Release 2-Pack: Locks for Wheels", Reference 110, https://pinheadlocks.com/store/en/wheel-locks/6-2-pack-wheel-locks.html#/spare_key-_", © 2013-2015, four (4) pages.

Delta Cycle, "Unordinary Gear for the Practical Cyclist", Wheel Security Systems, Fort Knox for Wheels, www.deltacycle.com, 2016, two (2) pages.

Delta Cycle, Hublox Skewers, https://deltacycle.com/index.php?route=product/product&product_id=139&search=hublox, downloaded Jul. 18, 2016, four (4) pages.

* cited by examiner

BICYCLE SKEWER ROD AND LOCK ASSEMBLY

RELATED APPLICATIONS

This application claims benefit of and priority to U.S. Provisional Application Ser. No. 62/218,108 filed Sep. 14, 2015, under 35 U.S.C. §§ 119, 120, 363, 365, and 37 C.F.R. § 1.55 and § 1.78, which is incorporated herein by this reference.

BACKGROUND OF THE INVENTION

The front and rear tires of a bicycle may be designed to quickly release from the bicycle frame for ease in transporting the bicycle and/or repairing a tire. Unfortunately, some quick release designs can lead to theft of the tires and/or the entire bicycle both of which can be very expensive. See U.S. Pat. Nos. 5,005,390; 5,337,587; 8,061,169; and RE38,162 all incorporated herein by this reference.

A number of lock devices for quick release mechanisms have been developed some of which are fairly complex and/or costly. Examples include the Kryptonite "Security Wheelnutz" and the Pinhead "Quick Release Locks for Wheels".

It is also known to configure the skewer rod nut with a hex head or other keyway or structure which requires a special tool to remove the nut from the skewer rod. See the Delta Bolt-on Skewers for Quick-Release Wheel Hubs and "Hublox Locking Skewers". Still, it is often possible to use a pliers or the like to grasp the nut with enough force to remove it.

BRIEF SUMMARY OF THE INVENTION

Featured is a bicycle skewer rod locking assembly which is not unduly complex and which is less costly. The security nut sub-assembly featured is difficult if not impossible to grasp with a pliers or the like.

In one embodiment, is a bicycle skewer rod and lock assembly comprises a skewer rod with a cap on one end of the skewer rod. A security nut sub-assembly is adapted for the other end of the skewer rod. The preferred security nut sub-assembly includes a nut securable to the skewer rod and having a plurality of spaced peripheral keyways. A sleeve is cupped around the periphery of the nut and is rotatable with respect to the nut. The sleeve includes a plurality of spaced sidewall keyways. A key tool includes a plurality of spaced inwardly depending keys each received through a sleeve sidewall keyway and into a nut peripheral keyway to turn the nut with respect to the skewer rod when the sleeve sidewall keyways are aligned with the nut peripheral keyways.

Preferably, the sleeve closely surrounds the entire periphery of the nut and the nut is retained in the sleeve and rotates relative thereto. A ring may be configured to retain the nut in the sleeve in a rotatable fashion. In one design the sleeve includes an internal seat and the nut includes a feature such as a ledge seated on the internal seat of the sleeve. The nut may further include a collar extending beyond the sleeve internal seat and outwardly flared underneath the ring. The nut may include a lower ledge receiving the ring thereunder.

Also featured is a bicycle security nut system including a nut with a threaded hole receiving a threaded end of a skewer rod and a sleeve rotatable with respect to the nut and surrounding the periphery of the nut. The nut is retained in the sleeve via a ring rotatable with respect to the nut and the sleeve.

Preferably, the nut and the sleeve may include at least one keyway and further included is a key including at least one key received in the keyways.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 3:
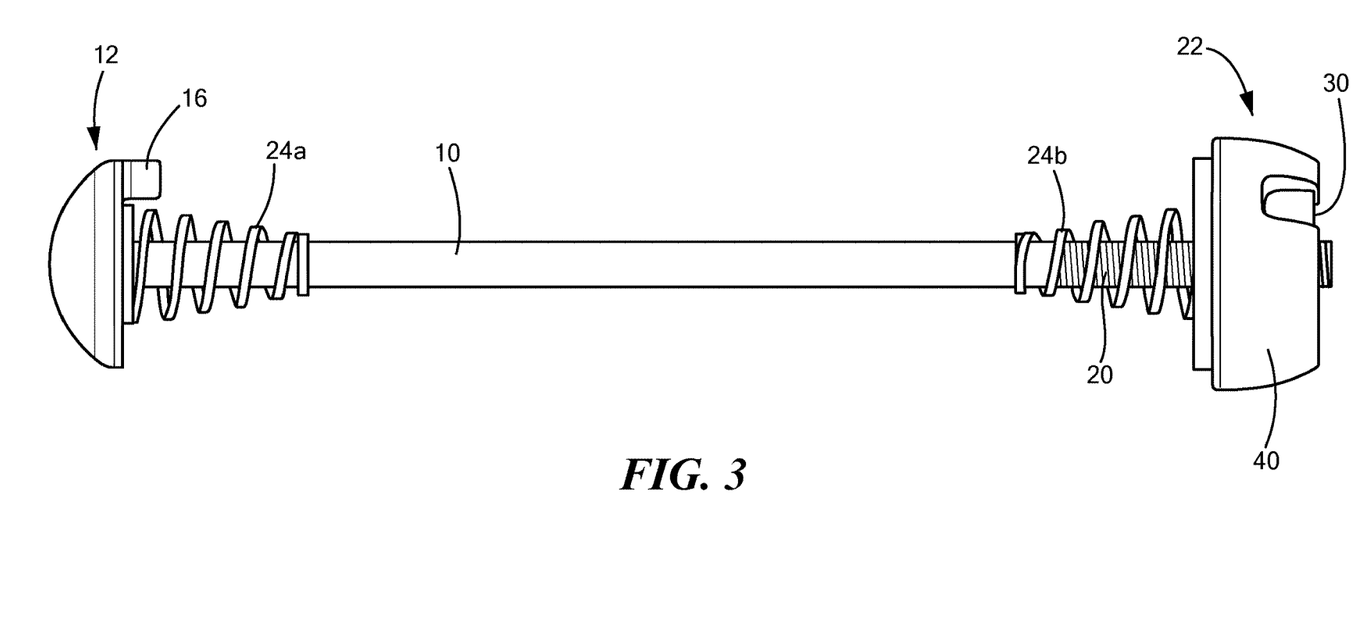
FIG. 3 is a schematic view showing the security nut sub-assembly in place on the skewer rod.

Featured is a bicycle skewer rod locking assembly. In one design, skewer rod 10, FIGS. 1-3 has a round cap 12 fixed thereto one end. Cap 12 may include a knurled internal surface 14 and a post 16 receivable in a corresponding socket in the bicycle fork assembly. The opposite end of skewer rod 10 is threaded as shown as 20. Security nut sub-assembly 22 can be realeasably secured to threaded end 20 of skewer rod 10. Springs 24a and 24b may also be provided.

Figures 1, 2:
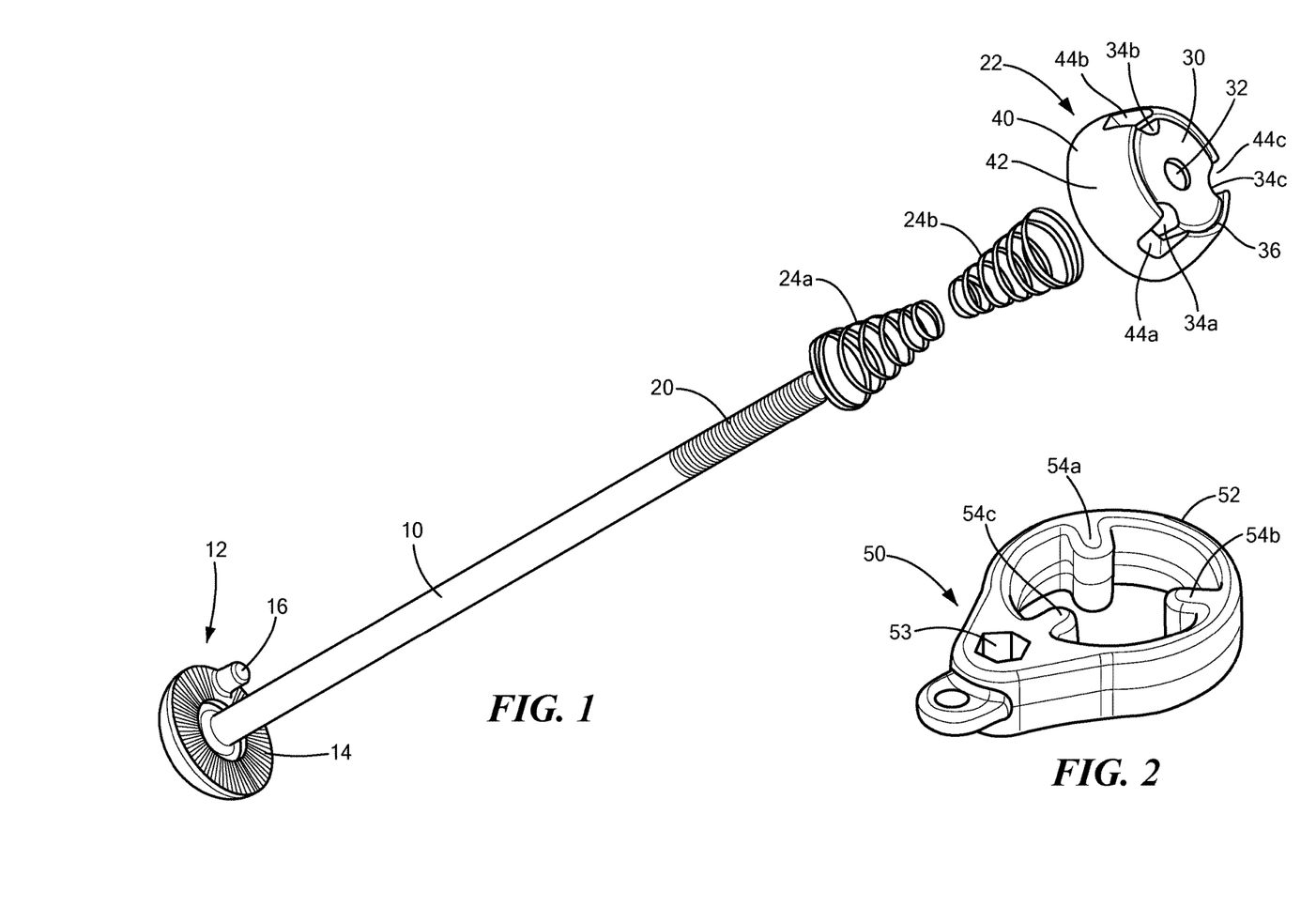
FIG. 1 is schematic exploded view showing the primary components associated with an embodiment of a bicycle skewer rod locking assembly.
FIG. 2 is a schematic view showing a key tool for removing the security nut sub-assembly shown in FIG. 1.

Security nut sub-assembly 22 features nut 30 with threaded hole 32 threadable onto threaded end 20 of skewer rod 10.

Preferably, nut 30 includes peripheral spaced concave keyways 34a, 34b, and 34c formed into external wall 36. Security nut sub-assembly 22 also features a (e.g., metal) sleeve 40 cupped around nut 30 and rotatable with respect thereto.

As such, if a would be thief attempts to use a wrench or plyers to grip sleeve 40, it will rotate but not nut 30. Sidewall 42 of sleeve 40 is preferably cupped around the periphery of the nut closely surrounding the entire periphery of the nut.

Sleeve 40 sidewall 42 includes a corresponding number of spaced keyways 44a, 44b, and 44c through the sidewall. When aligned with keyways in the nut, key 50, FIG. 2 can be used to turn the nut with respect to rod 10. Key 50 includes ring structure 52 with inwardly depending keys 54a, 54b, and 54c each received through a sleeve sidewall keyway 44 and into a nut keyway 34 to engage the nut when the key 50 is placed over sleeve 40. Thus, turning key 50 turns nut 30 when the nut keyways 34 are aligned with the ring keyways 44 and the key teeth are engaged with the nut keyways. Key 50 may also include an Allen wrench socket 53 to assist in turning the key and thus the nut.

Figure 4:
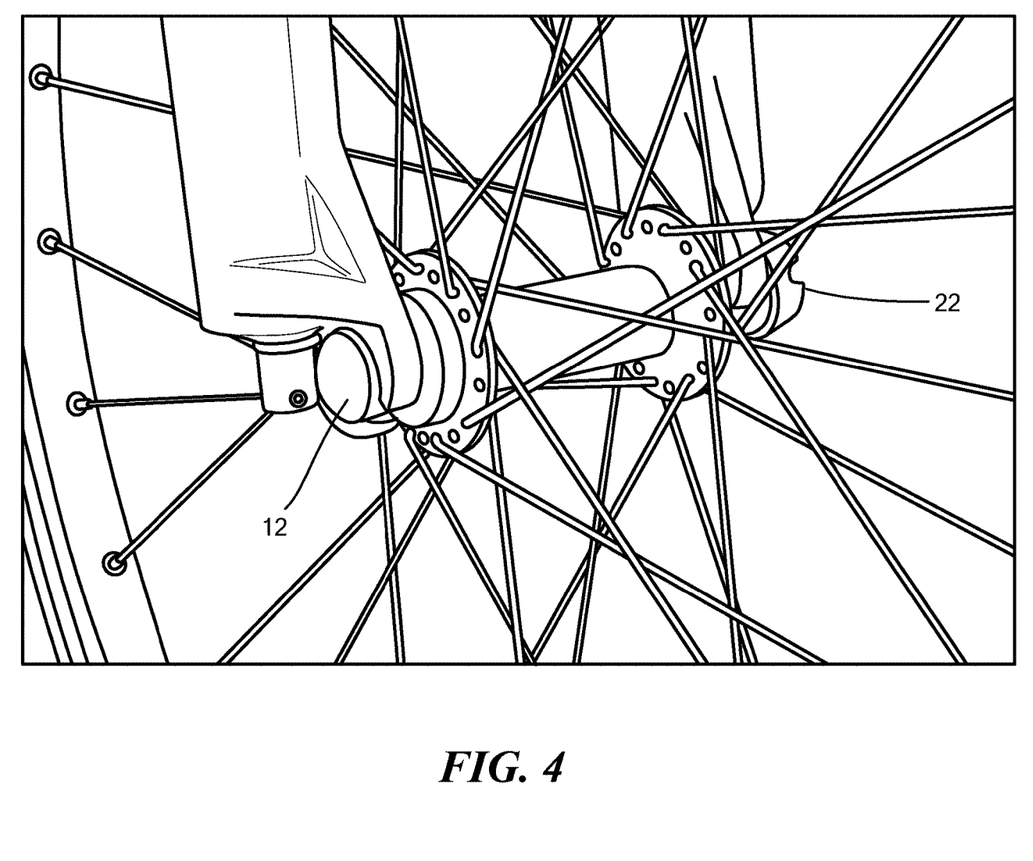
FIGS. 4 and 5 are schematic views showing the bicycle skewer rod assembly and security nut sub-assembly in place on a bicycle frame assembly.
Figure 5:
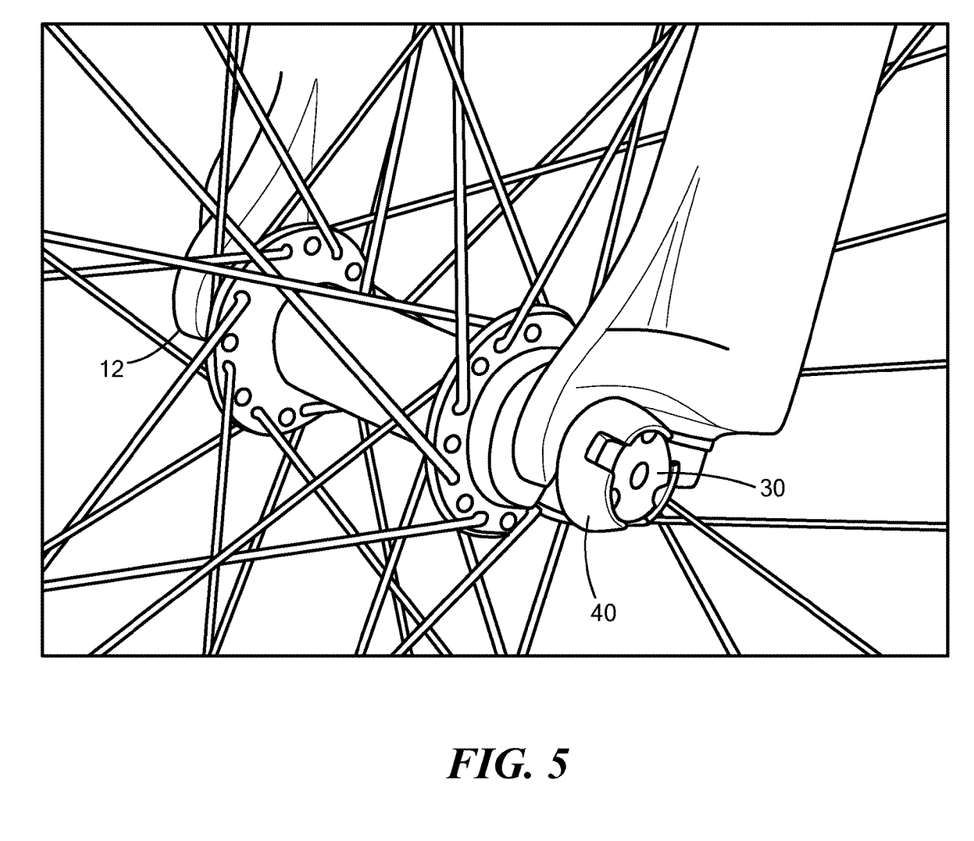

FIGS. 4 and 5 show the bicycle skewer rod locking assembly in place securing a tire to a bicycle hub and frame assembly.

Figure 6:
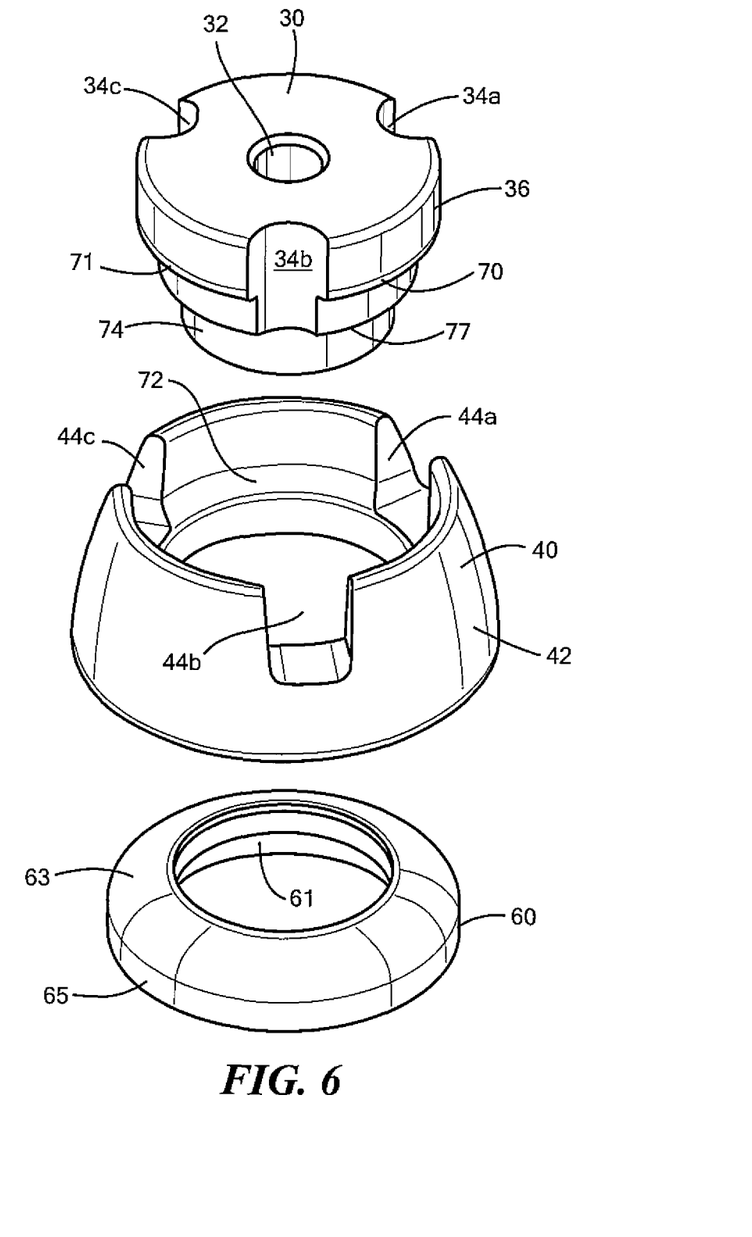
FIG. 6 is an exploded view showing the primary components associated with a security nut sub-assembly.
Figure 7:
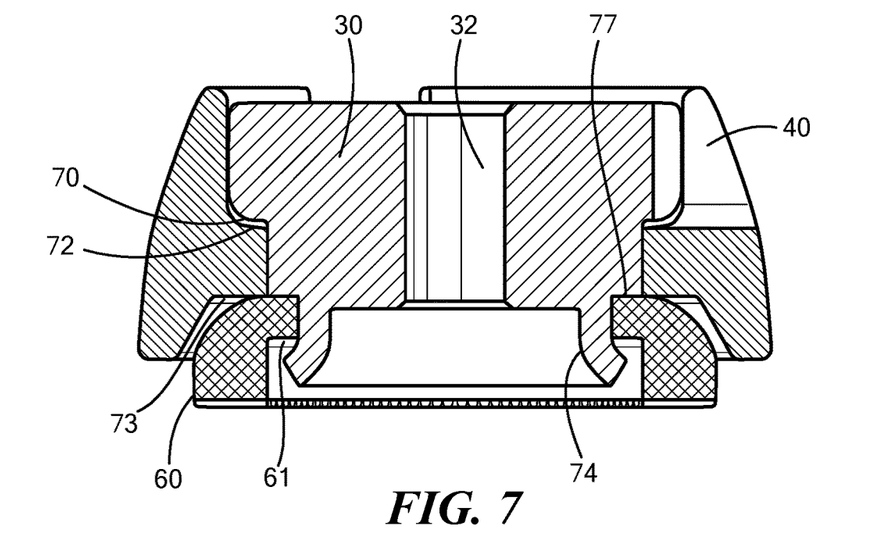
FIG. 7 is a schematic cross sectional view of the security nut sub-assembly of FIG. 6.
Figure 8:
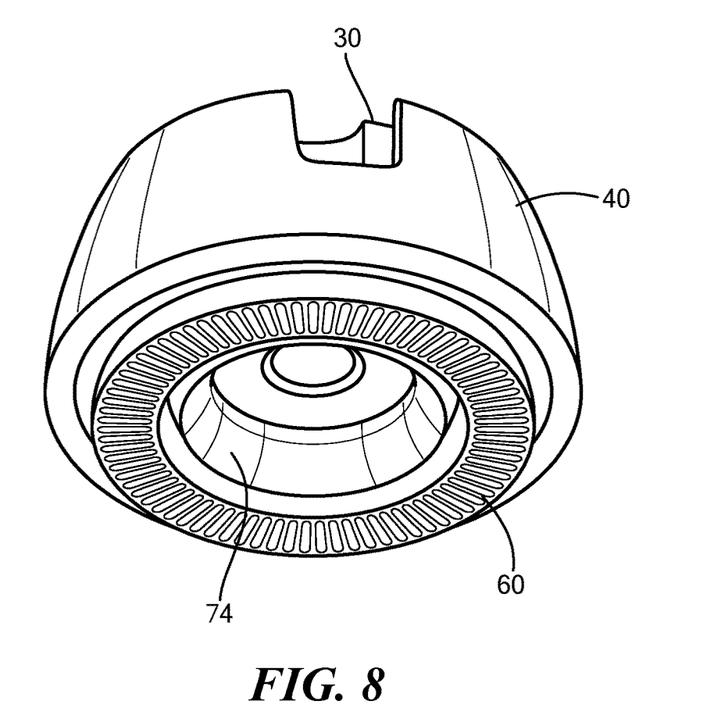
FIG. 8 is a schematic view showing the bottom of the security nut sub-assembly of FIGS. 6 and 7.
Figure 9:
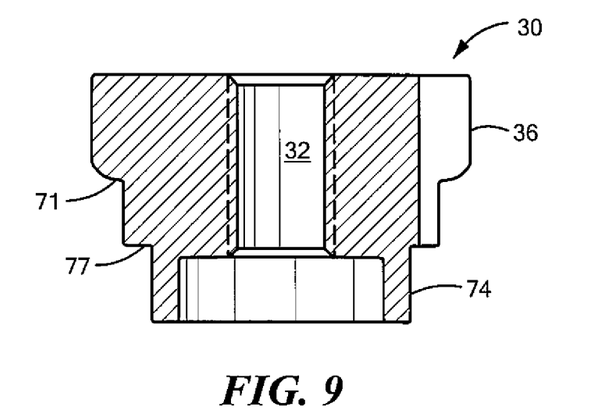
FIG. 9 is a schematic cross sectional view showing the nut of the security nut sub-assembly in accordance with a preferred embodiment of the invention.
Figure 10:
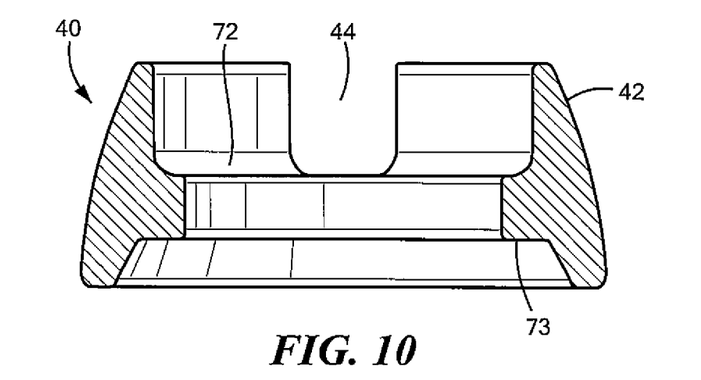
FIG. 10 is a schematic cross sectional view showing a preferred embodiment of the sleeve component of the security nut sub-assembly.
Figure 11:
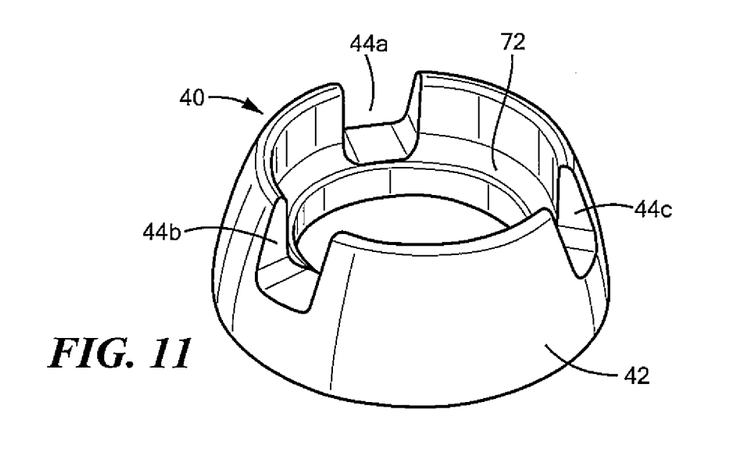
FIG. 11 is a schematic three dimensional view of the sleeve shown in FIG. 10.
Figure 12:
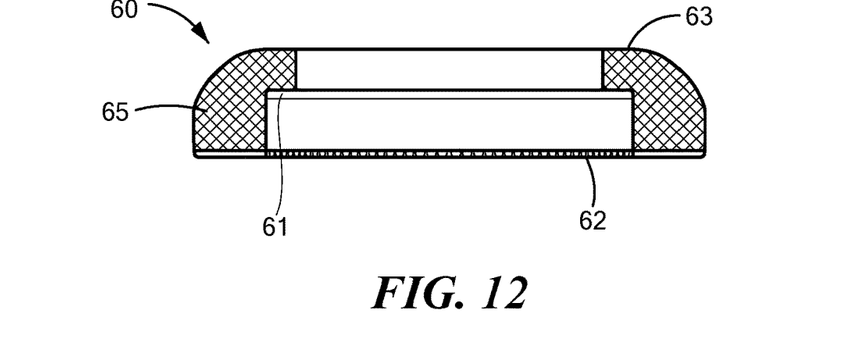
FIG. 12 is a schematic cross sectional view showing a ring component in accordance with a preferred embodiment of the security nut sub-assembly.

To rotatably retain sleeve 40, FIGS. 6-8 cupped about nut 30, ring 60 may be used. In one specific design, shoulder 70 of nut 30 rests on seat or ledge 72 internal to sleeve 40. Ring 60 (with bottom knurled surface 62) then fits about the bottom thin walled collar 74 of nut 30 and resides partially within sleeve 40. Collar 74 of nut 30 may be cut or scored in several places so it can be flared outward underneath ring 60 undercut 61 to retain ring 60 thereon. See FIG. 7. Still, nut 30 rotates with respect to sleeve 40 and ring 60 rotates with respect to both sleeve 40 and nut 30.

When knurled bottom surface 62 of ring 60 locks into a corresponding knurled surface associated with the bicycle hub assembly, ring 60 stops turning and nut 30 is then turned on the threads of the skewer rod to tighten the security nut sub-assembly onto to the skewer rod hub and bicycle frame assemblies.

Figure 13:
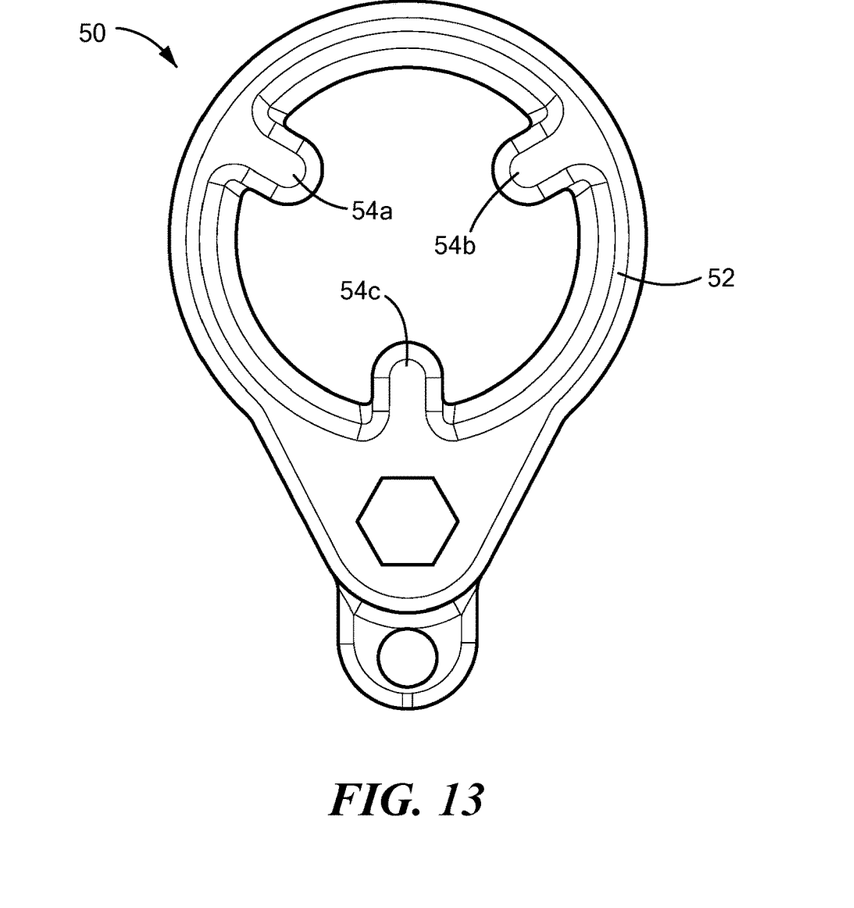
FIG. 13 is a schematic top view of the key tool shown in FIG. 2.
Figure 14:
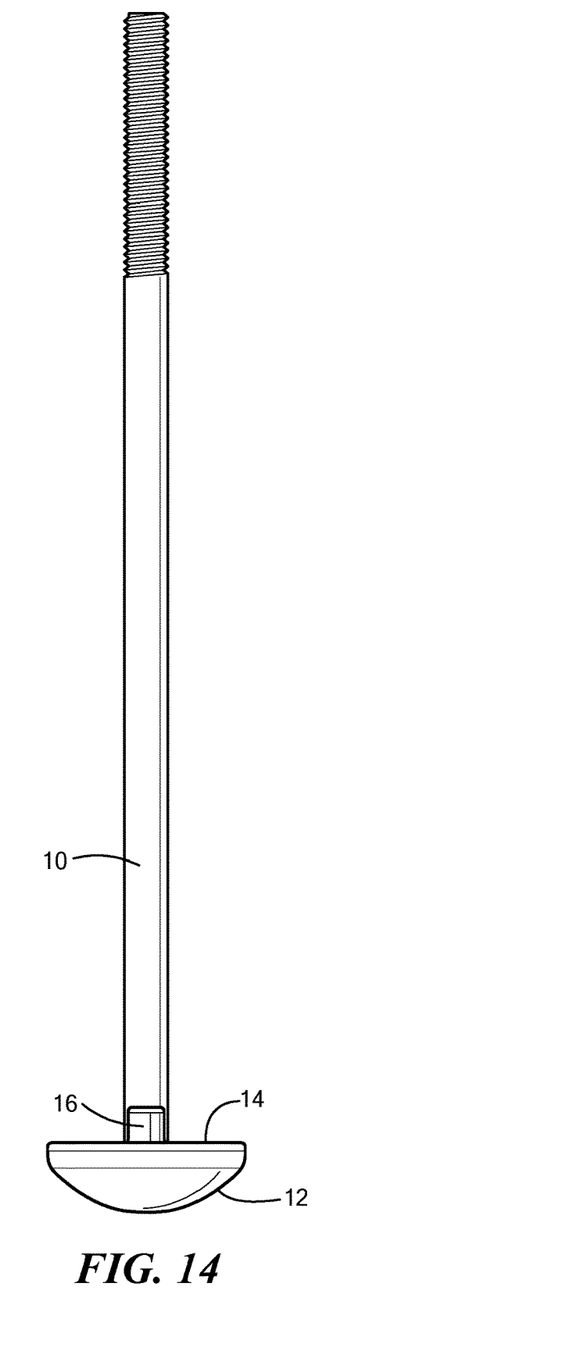
FIG. 14 is a schematic view showing a skewer rod and a cap on one end of the skewer rod.
Figure 15:
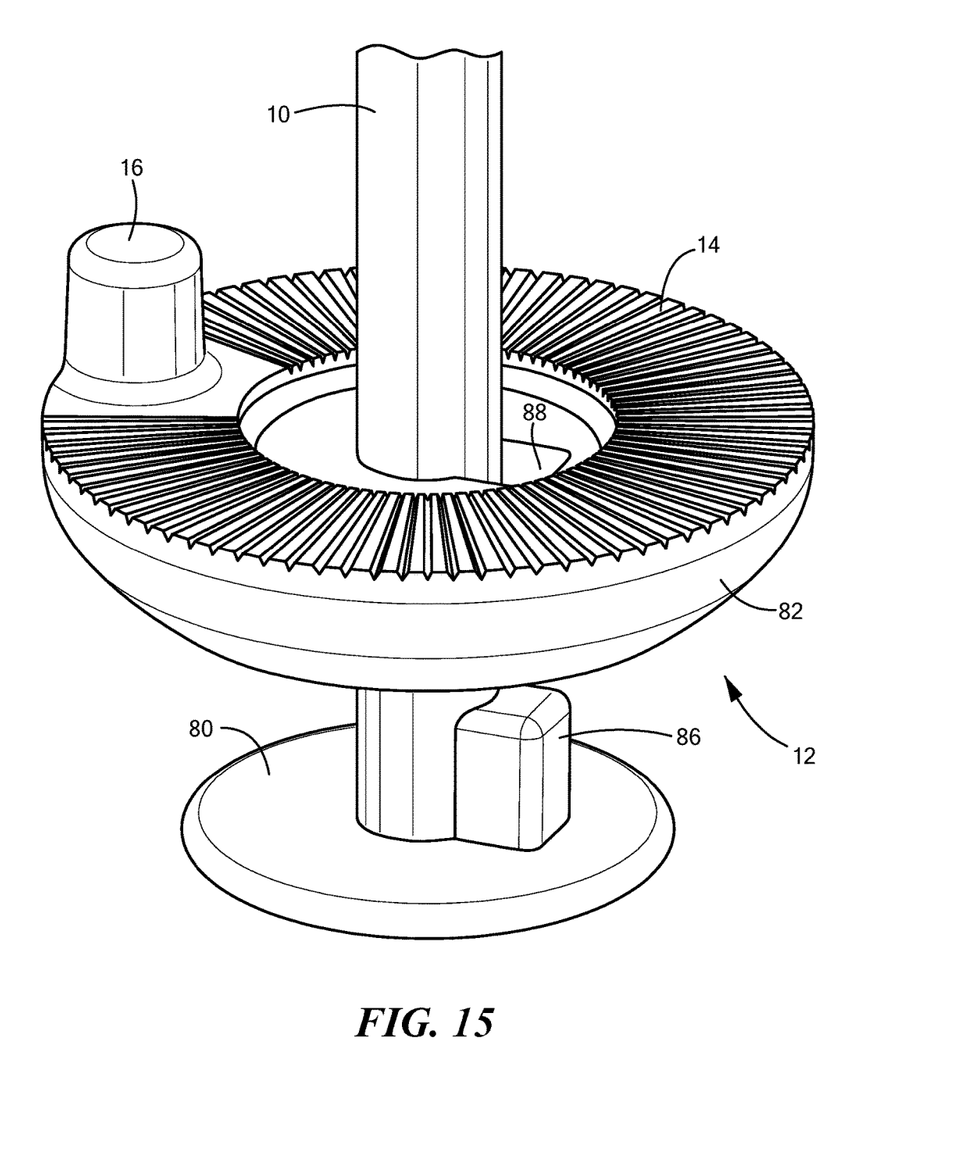
FIG. 15 is a schematic view showing one version of the cap sub-assembly and skewer rod shown in FIG. 14.

FIGS. 9-12 show additional views of the nut, sleeve, and ring. FIG. 13 shows the key 50 and FIGS. 14-15 show the cap sub-assembly which may include flared member 80 fixed to rod 10 and keyed to knurled member 82 via key 86 received in keyway 88. Other figures in the drawing package show additional features of the system.

The security nut sub-assembly sleeve preferably includes an internal cavity for the nut and both the sleeve and the nut include features which allow the nut to be retained in the sleeve and to rotate relative thereto. Further, the nut may include a feature which enables it to be rotatably secured to a ring and the ring and sleeve include features which retain the ring (and thus the nut) in the sleeve.

For example, nut 30 includes inwardly cut ledge 71, FIG. 6 and sleeve 40 includes seat 72 internal to the sleeve cavity for inwardly cut ledge 71 of the nut 30. Small diameter collar 74 of nut 30 extends beyond the sleeve seat and is forced outwardly to flare beneath undercut 61 of ring 60. Ring top surface 63 and sidewall 65 is sized so that it cannot pass beyond the undercut lower ledge 73 of sleeve 40. And, nut 30 includes lower inward ledge 77 above collar 74 which receives the top wall 63 of ring 60.

The metal skewer rods may be sized for different size and/or brands or models of bicycles and they may be adapted for both the front and rear tire and axle assemblies. For example, the skewer rod assembly of FIG. 1 may be configured for a front ($9/100$ axle spacing) or for a rear ($10/135$ axle spacing). The metal nut will generally be the same size amongst different skewer rod sizes and types but the diameter of nut threaded hole 32 will then correspond to the outer diameter of the threaded portion of the skewer rod. In other examples, an existing (e.g., stock) bicycle skewer rod can be used in conjunction with the security nut sub-assembly disclosed which may be provided in pairs for an existing skewer rod.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A bicycle skewer rod and lock assembly comprising:
   a skewer rod;
   a cap on one end of the skewer rod;
   a security nut sub-assembly for the other end of the skewer rod, the security nut sub-assembly including:
      a nut securable to the skewer rod and having a plurality of peripheral keyways,
      a sleeve cupped around the periphery of the nut and rotatable with respect to the nut,
      the sleeve including a plurality of sidewall keyways; and
   a key including a plurality of inwardly depending keys each received through a sleeve sidewall keyway and into a nut peripheral keyway to turn the nut with respect to the skewer rod when the sleeve sidewall keyways are aligned with the nut peripheral keyways.

2. The assembly of claim 1 in which the sleeve closely surrounds the entire periphery of the nut.

3. The assembly of claim 1 in which the nut is retained in the sleeve and rotates relative thereto.

4. The assembly of claim 3 further including a ring configured to retain the nut in the sleeve in a rotatable fashion.

5. The assembly of claim 4 in which the sleeve includes an internal seat and the nut includes a feature seated on the internal seat of the sleeve.

6. The assembly of claim 5 in which the nut includes a collar extending beyond the sleeve internal seat outwardly flared underneath said ring.

7. The assembly of claim 6 in which the nut includes a lower ledge receiving the ring thereunder.

8. The assembly of claim 4 in which the ring includes a knurled bottom surface.

9. A bicycle security nut system comprising:
a nut securable to a skewer rod and having a plurality of peripheral keyways;
a sleeve cupped around the periphery of the nut and rotatable with respect to the nut;
the sleeve including a plurality of sidewall keyways; and
a key including a plurality of inwardly depending keys each received through a sleeve sidewall keyway and into a nut peripheral keyway to turn the nut with respect to the skewer rod when the sleeve sidewall keyways are aligned with the nut peripheral keyways.

10. The system of claim 9 in which the sleeve closely surrounds the entire periphery of the nut.

11. The system of claim 9 in which the nut is retained in the sleeve and rotates relative thereto.

12. The system of claim 9 in which the sleeve includes an internal seat for the nut.

13. The system of claim 12 in which the nut includes a collar extending beyond the sleeve internal seat.

14. The system of claim 13 further including a ring about the nut collar.

15. The system of claim 14 in which the nut collar is flared under a feature of the ring.

16. The system of claim 14 in which the nut rotates with respect to the ring.

17. The system of claim 14 in which the sleeve includes a ledge and the ring includes a surface abutting said ledge.

18. The system of claim 14 in which the nut includes a ledge above said collar and the ring includes a surface abutting said ledge.

19. A bicycle security nut system comprising:
a nut with a threaded hole receiving a threaded end of a skewer rod;
a sleeve rotatable with respect to the nut and surrounding the periphery thereof;
the nut retained in the sleeve via a ring rotatable with respect to the nut and the sleeve, the nut and the sleeve including at least one keyway and further including a key including at least one key received in said keyways.

20. The system of claim 19 in which the sleeve includes an internal seat for the nut.

21. The system of claim 20 in which the nut includes a collar extending beyond the sleeve internal seat.

22. The system of claim 21 in which the nut collar is flared under a feature of the ring.

23. The system of claim 21 in which the sleeve includes a ledge and the ring includes a surface abutting said ledge.

24. The system of claim 21 in which the nut includes a ledge above said collar and the ring includes a surface abutting said ledge.

25. The system of claim 19 in which said at least one key is an inwardly depending key.

\* \* \* \* \*